United States Patent [19]

Okumura

[11] Patent Number: 5,208,758
[45] Date of Patent: May 4, 1993

[54] UNBALANCE POINT CORRECTIVE METHOD AND APPARATUS

[76] Inventor: Hiromitsu Okumura, 241-2, Mihara-cho-Kuroyama, Minamikawachi-gun, Osaka, Japan

[21] Appl. No.: 594,781

[22] Filed: Oct. 9, 1990

[30] Foreign Application Priority Data

Oct. 6, 1989 [JP] Japan .................................. 1-262679

[51] Int. Cl.⁵ ............................................. G01M 1/22
[52] U.S. Cl. .................................... 364/463; 364/508; 73/462
[58] Field of Search ........................ 364/463, 508, 550; 73/462

[56] References Cited

U.S. PATENT DOCUMENTS

| | | | |
|---|---|---|---|
| 4,162,634 | 7/1979 | Hofmann | 73/462 |
| 4,262,536 | 4/1981 | Orem et al. | 73/462 |
| 4,357,832 | 11/1982 | Blackburn et al. | 73/462 |
| 4,377,946 | 3/1983 | Donato | 73/457 |
| 4,457,172 | 7/1984 | Mathes et al. | 73/462 |
| 4,489,606 | 12/1984 | Shiohata et al. | 364/463 X |
| 4,545,021 | 10/1985 | Suzuki et al. | 364/571 |
| 4,926,341 | 5/1990 | Guyot | 364/508 |

Primary Examiner—Thomas G. Black
Attorney, Agent, or Firm—Edwin E. Greigg; Ronald E. Greigg

[57] ABSTRACT

A method and apparatus for correcting the unbalance of a rotatable object wherein the apparatus learns from past errors and automatically adjusts to improve future unbalance corrections of the object. The object is rotated a first time and the amount and angular location of unbalance is detected and recorded. The object is than corrected for this measured unbalance and the corrected object is rotated again. The amount and angle of any remaining unbalance is detected. Then the first detected unbalance is combined with the unbalance detected in the corrected object to obtain a correction quantity which can be used when later correcting said object. The invention can be used on objects which have two separate planes of unbalance to correct the unbalance in both planes. The invention can also correct for any errors caused by any inaccuracies in the plane separation process.

7 Claims, 4 Drawing Sheets

FIG. 2a
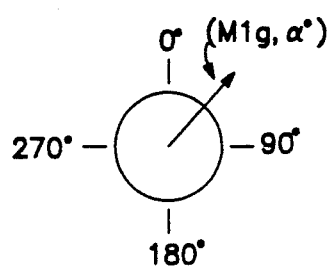
FIG. 2b
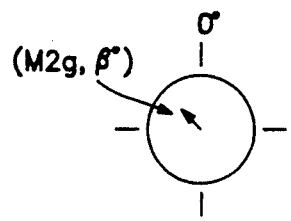
FIG. 2c
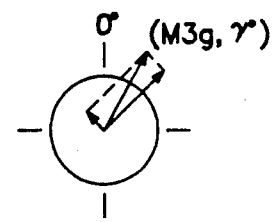
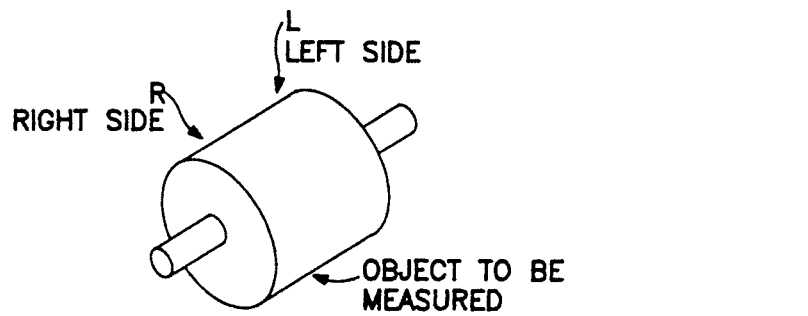
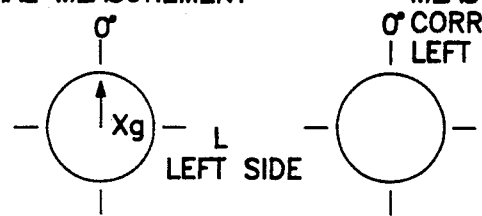
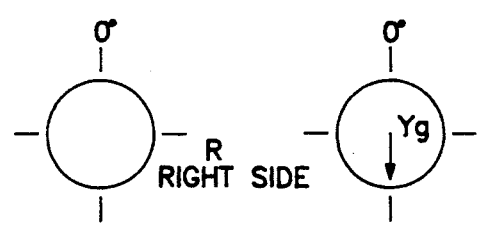
FIG. 3

UNBALANCE POINT CORRECTIVE METHOD AND APPARATUS

BACKGROUND OF THE INVENTION

The present invention pertains to unbalance measuring and correcting methods and apparatus for rotatable bodies requiring good rotational balance. In particular, it pertains to an unbalance point measuring method and apparatus to more accurately measure unbalance points and to correct errors occurring due to deviations introduced by the measuring apparatus and/or the correction apparatus. It overcomes the errors introduced by the apparatus by using a learning process.

In the past, unbalance points have been corrected using the results of a measurement of the unbalance points of a rotatable object as corrective data. After correcting the object based on this corrective data, the corrected object was measured again and if the unbalance found in the second measurement was still greater than an acceptable preset standard value, the object was corrected again, this time using the results of the second measurement as corrective data. Again the corrected object was measured and, if necessary, the object was corrected again. This process of measuring, correcting and measuring again could be repeated many times before an acceptable level of unbalance was found. This creates a problem of low work efficiency. In this prior art process there was no learning involved. If the measuring and/or correcting apparatus was introducing a repeated error in the process, this error was merely accepted and the process repeated an unnecessarily large number of times.

Further, if the rotatable body had significant thickness, a separation would have to be made between the unbalance on one side of the body and the unbalance on the other side of the body. If this separation were made inaccurately, a problem would arise with respect to a new unbalance point created on one side due to the inaccurate correction made on the other side. U.S. Pat. Nos. 4,419,894 to Matumoto and U.S. Pat. No. 4,868,762 to Grim et al show examples of prior art unbalance measuring devices which deal with the problems of separation of two unbalance planes in a rotatable body.

OBJECTS AND SUMMARY OF THE INVENTION

In order to overcome the above-mentioned disadvantages in an unbalance point corrective method according to the present invention, unbalance points are measured a first time by rotating an object to be measured; the unbalance points are corrected in said measured object in a conventional manner by using prescribed corrective characteristics based on the results obtained from this first measurement of the unbalance points; then the measured object is rotated and measured a second time; then a correction is not made to the object by merely using the results of this second measurement as would be done according to the prior art, but instead a correction is made to the prescribed corrective characteristics based on the results of the second measurement to produce corrected corrective characteristics and thereafter the correction of the unbalance points, if necessary, is made in accordance with the corrected corrective characteristics.

Instead of carrying out repeated corrections to the rotatable body based on fixed prescribed corrective characteristics as was done in the prior art, the present invention involves a learning process wherein after a first measurement, correction and second measurement are made in a conventional manner, the results of both the first and the second measurements are used to correct the prescribed corrective characteristics before subsequent unbalance corrections to the rotatable body are made. Thus the prior art blindly repeated the correction process without learning from the errors made in measuring and/or correcting the rotatable body, while the present invention learns from the errors made in the first correction of the rotatable body and, after that, subsequent corrections to the body are made using what has been learned.

The corrective characteristics herein refer to an overall combination of the relationship between the vibration of an unbalance point and unbalance signal from the left or the right of the object obtained by separating a side to be corrected; the relationship between the measured unbalance amount and the actual amount of correction made of the unbalance points; and the relationship between an unbalance phase and the actual angle at which to position the measured object for carrying out the unbalance corrections.

To correct the corrective characteristics means that these relationships are corrected.

The correction apparatus of unbalance points in the present invention comprises such means as an unbalance point measuring apparatus to measure the unbalance points by rotating an object to be measured; corrective data operational/computing circuit to operationally output the corrected data in accordance with prescribed corrective characteristics based on the measurement result of the unbalance points obtained; an unbalance point correction apparatus to correct unbalance points of said measured object based on the corrective data; a control circuit to control said unbalance point measuring of unbalance points in order to measure said once measured and corrected object again for its unbalance points; and a correction circuit for corrective characteristics to correct said corrective characteristics based on the measurement result of unbalance points if the result of the second measurement is greater than a preset acceptable standard level.

According to the unbalance point corrective method and the apparatus therefor, the first measurement of unbalance points is made by rotating an object to be measured, a mechanical correction of the unbalance points is made in accordance with prescribed corrective characteristics based on the measurement result of the unbalance points obtained; and thereafter, the object is rotated again and a second measurement is made on the same measured object for unbalance points.

If the result of the second measurement of unbalance points is still greater than the preset acceptable standard level, said prescribed corrective characteristics are corrected based on the results of the first and second measurements and the subsequent correction of unbalance points is made using the corrected corrective characteristics rather than the originally prescribed corrective characteristics.

Thus by eliminating the errors introduced by said measuring method and apparatus as well as the unbalance point correction method and apparatus, it becomes possible to maintain the number of mechanical corrections to a minimum and the unbalance amount under the acceptable standard level.

In other words, the present invention can provide an unbalance point correction apparatus which includes a learning function.

BRIEF DESCRIPTION OF THE DRAWINGS

FIGS. 2a, 2b and 2c denotes the correction unbalance amounts and angles;

FIG. 3 denotes the correction of the separation of a side to be corrected in a rotatable object having to different planes of unbalance;

DETAILED DESCRIPTION OF THE PREFERRED EMBODIMENTS

Following is a detailed description of an unbalance point corrective method and an apparatus pertaining to the present invention.

Figure 1:
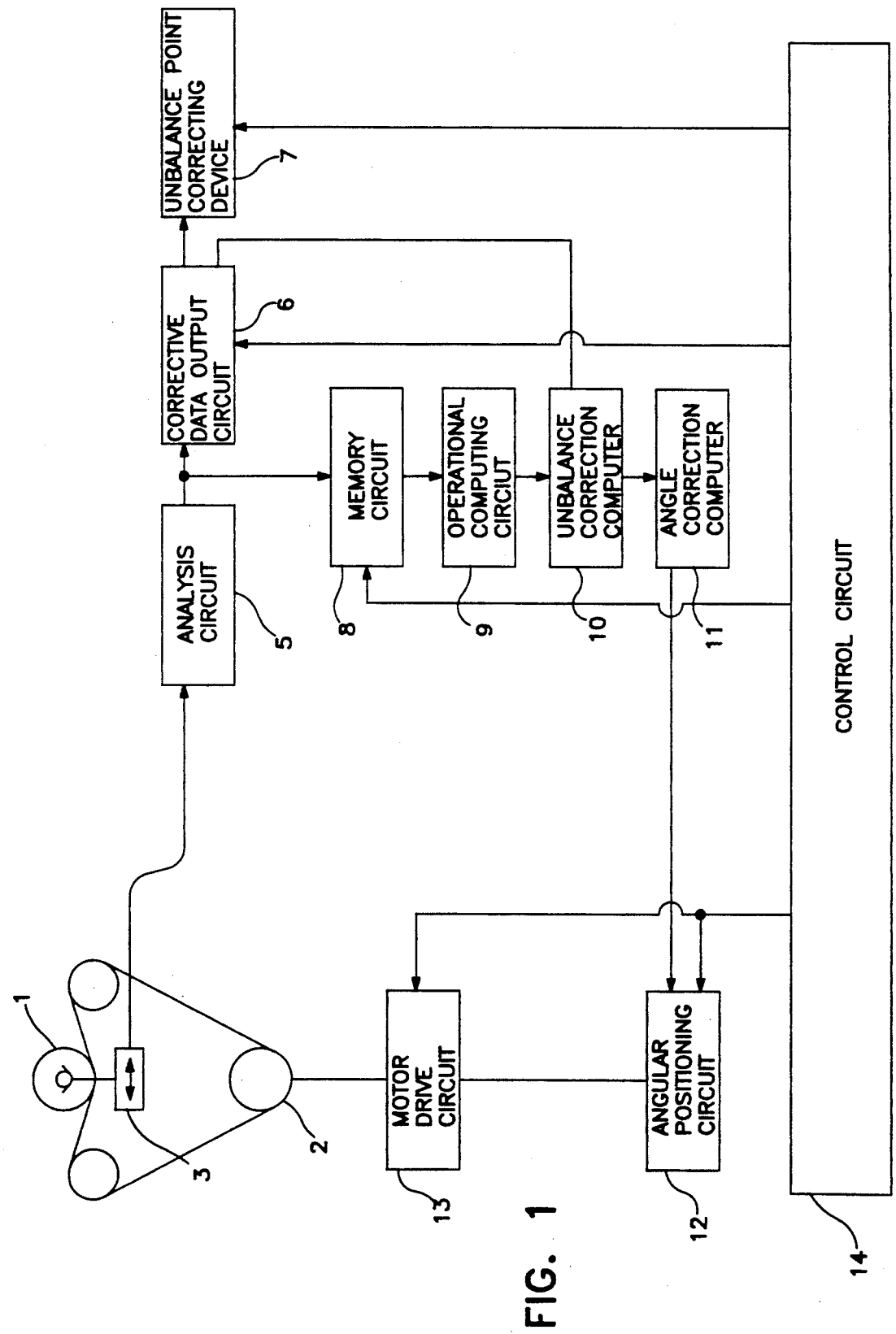
FIG. 1 is a block diagram of a preferred embodiment of apparatus to be used for an unbalance point corrective method of the present invention.
Figure 4:
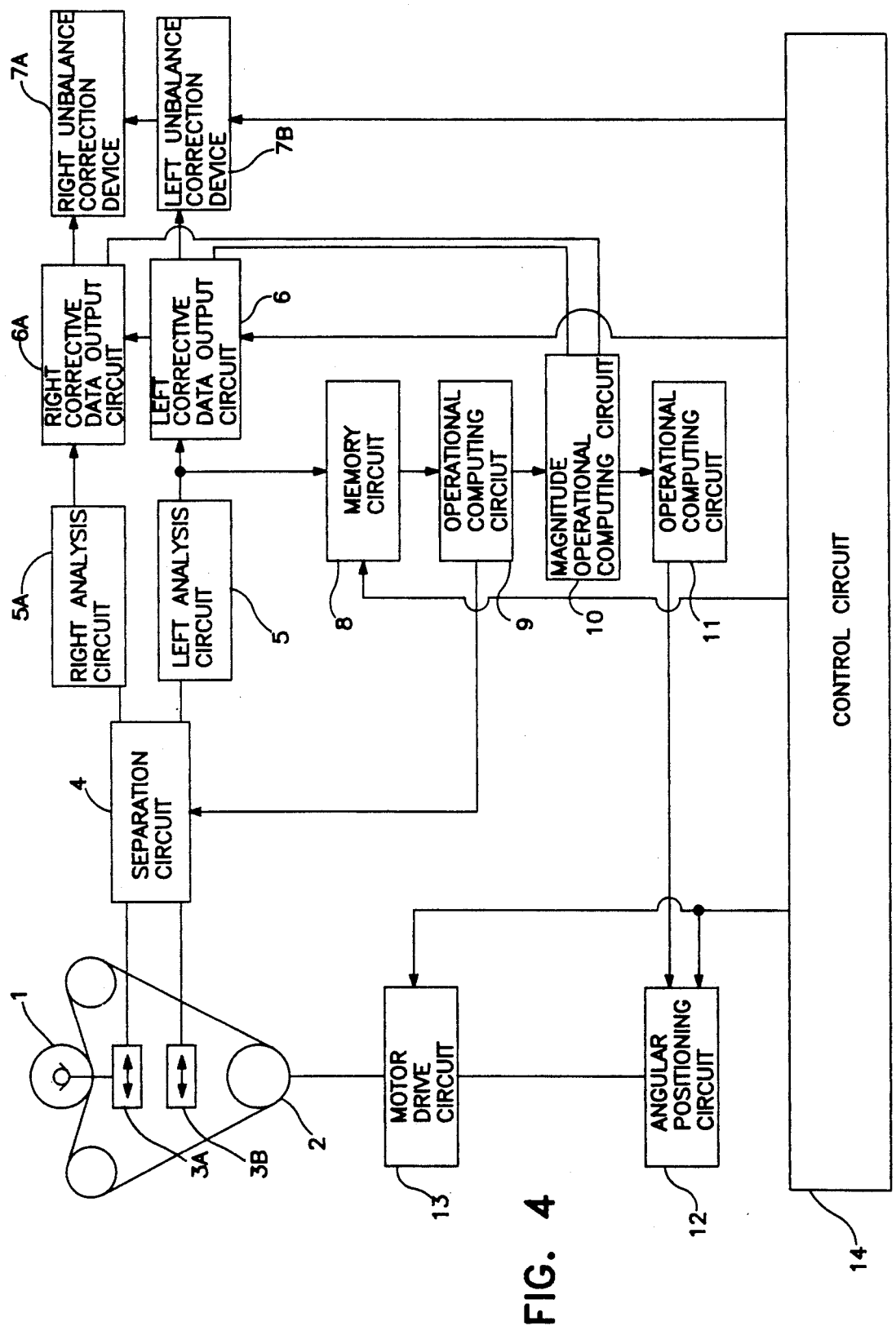
FIG. 4 is a block diagram of a preferred embodiment of apparatus to be used for an unbalance point corrective method of the present invention where the rotatable object being measured and corrected has two different planes of unbalance.

FIG. 1 is a block diagram of apparatus for use in unbalance measurement and correction of rotatable objects having essentially only one plane of unbalance. The axial dimension of such objects would be small when compared to the overall size of the object. FIG. 4 is a block diagram of apparatus for use with rotatable objects whose axial length requires the measurement and correction of unbalance in two different planes of the objects. The blocks in FIGS. 1 and 4 which refer to similar devices are given the same numerical identification.

In FIG. 1, the numeral 1 refers to a rotatable object to be measured and corrected. The numeral 2 refers to a motor which rotates the object 1 to be measured. The numeral 3 refers to a vibration detecting device of unbalance points. The numeral 5 refers to an analysis circuit. The numeral 6 refers to a corrective data output circuit. The numeral 7 is an unbalance point correcting device. The numeral 8 refers to a memory circuit for storing the magnitude and angle of unbalance. The numeral 10 refers to an operational/computing to correct a magnitude of unbalance to be corrected. The numeral 11 refers to an operational/computing circuit to correct the positioning angle of the object to be corrected. The numeral 12 refers to an angular positioning circuit. The numeral 13 refers to a motor drive circuit to control motor 2. Numeral 14 refers to a control circuit to control the individual equipments and devices mentioned above.

First, control circuit 14 sends signals to rotate motor 2 by way of motor drive circuit 13, which rotates object 1 to be measured for vibrations due to unbalance in the object. Control circuit 14 can be formed by simple combinations of logic circuits which emit control signals on the correct lines at the proper times. The functioning of control circuit 14 can be quite similar to the sequence control and switch control circuits shown in the above cited Matumoto U.S. Pat. No. 4,419,894.

Vibration of the rotating object is detected by a vibration detecting device 3 and an unbalance signal is obtained. The signal is analyzed and by an analyzer 5 which outputs the angular position of the unbalance and the amount of the unbalance. Analyzer circuits for carrying out the functions of analyzer 5 are common in the art. The amount and angle values are recorded in memory circuit 8. This memory circuit 8 can include a central processing unit and a random access memory quite similar to such devices in the above cited Grim et al U.S. Pat. No. 4,868,762.

Based, on the unbalance angle obtained, a positioning circuit 12 positions the object 1 to be corrected at the proper angular position for carrying out a correction. Based on the unbalance amount measured, a corrective control circuit 6 controls a correcting device 7 which carries out the correction of the measured unbalance. Since the details of positioning circuits and automatic unbalance correcting devices are well known in the art and this invention does not depend on any particular set of such details, positioning circuit 12 and correcting device 7 will not be described in detail.

After the unbalance of the object has been once corrected, under the direction of control signals from control circuit 14, the object is rotated again and a second measurement of unbalance is made. The results of this second measurement are also stored in memory circuit 8.

Instead of using the results of this second measurement directly to control a second mechanical correction of object, these results are combined with the results of the first measurement to obtain corrected corrective characteristics.

This can be explained with reference to FIG. 2.

FIG. 2(a) shows the unbalance found in the first measurement. M1g is the amount of the unbalance while $\alpha$ is the angular position of that unbalance. M1g may be expressed in grams, for example. After a first mechanical correction has been made to the object by adding or subtracting weight, the object is again rotated and a second measurement is made. The result of this second measurement is shown in FIG. 2(b) where M2g is the amount of the second unbalance and $\beta$ is the angular position of this second unbalance. It can be seen that the measuring and correcting process has not fully corrected the unbalance but has introduced an error. If the results of this second measurement were blindly used to make a second correction, this error would be repeated and the number of further measurements and corrections could be quite large before an acceptably small level of unbalance was attained. According to the present invention this blind measurement and correction is not repeated but instead the apparatus learns from the previous error.

As can be seen from FIG. 2(c), in order to correct for the originally measured unbalance as well as for the error introduced by the measuring and/or correcting apparatus, the measured unbalance of (M1g, $\alpha$) should be treated as an unbalance of (M3g, $\Gamma$) before any mechanical correction is made. The angular difference of $(\alpha - \Gamma)$ is due to an error which occurred at positioning and such an error can be corrected from the next positioning on by setting a corrective data for positioning of $(\alpha - \Gamma)$ at the angular positioning circuit 12. Likewise, the magnitude difference of (M3−M1)g can corrected from the next correction on by setting a corrective data for the unbalance amount of (M3−M1)g at the correction circuit 6. In this way further mechanical corrections on the object will be made taking into account the errors introduced by the apparatus.

Of course the invention is applicable to a method and apparatus for correcting unbalance in an object which has two planes of unbalance. A second embodiment of the invention involving such an object is shown in the block diagram of FIG. 4. This embodiment is for use where the rotatable object has a significant axial dimension as illustrated in FIG. 3. The embodiment of FIG. 4 has two vibration detecting devices, one for each side of the object. In this embodiment the invention takes into account not only errors introduced by the measuring-/correcting apparatus but also takes into account errors caused by inaccurate separation of the unbalance on the two sides.

The Matumoto and Grim et al patents cited above disclose plane separation circuits but this invention deals with inaccuracies in plane separation remaining even after the separation process is completed.

The part numbers in FIG. 4 are consistent with the numbering in FIG. 1. In FIG. 4 element 1 is an object to be measured. The numeral 3A refers to a vibration detecting device for detecting unbalance points on the right. The numeral 3B refers to a vibration detecting device for detecting unbalance points on the left. The numeral 4 refers to a separation circuit for separating out the unbalances on the left and the right. The numeral 5A refers to a analysis circuit on the right for receiving the separated signal and producing signals representing both the measured angle and amount of the unbalance on the right. The numeral 5B refers to a similar analysis circuit on the left. The numeral 6A refers to a corrective data output circuit on the right and numeral 6B refers to a corrective data output circuit on the left. The numeral 7A and 7B refers to an unbalance point correcting devices on the right and left for adding to or subtracting from the rotatable object being balance corrected. As previously mentioned, numeral 8 refers to a memory circuit for storing the measured values representing the amounts and angles of the measured unbalance. The numeral 9 refers to an operational/computing circuit to correct the plane separation of the sides to be corrected. As previously mentioned, numeral 10 refers to an operational/computing circuit to correct the amount of unbalance to be corrected. As previously mentioned, numeral 11 refers to an operational/computing circuit to correct angular positioning of the object to be corrected. As previously mentioned, numeral 13 refers to a motor drive circuit to control motor 2. Numeral 14 refers to a control circuit to control the timing and the operation of the individual equipment and devices mentioned above.

In FIG. 4 control circuit 14 causes motor 2 to rotate by way of motor drive circuit 13. Through a belt arrangement, motor 2 rotates object 1 and any unbalance in object 1 causes vibrations.

These vibrations are detected by vibration detecting devices 3A and 3B on the right and left The signals from the detecting devices are separated by separation circuit 4 into a right unbalance signal and a left unbalance signal. The separated signals are analyzed by analyzers 5A and 5B on the right and the left to produce signals representing the amount of unbalance and the angular position of unbalance for each of the two sides. These pairs of angle and amount signals are recorded in memory circuit 8.

Based on the unbalance angle obtained, an angular positioning circuit 1 positions the object 1 to the proper position to be corrected. Based on the measured unbalance amount, a right or left corrective control circuit 6A or 6B controls a correcting device 7A or 7B on the right or left, and carries out a correction of the unbalance point.

Thereafter, in accordance with the instructions of the control circuit 14, a second unbalance amount and angle are obtained by rotating motor 2 again at a high speed and again making an unbalance measurement. The result of the second measurement and the result of the previous measurement stored in memory 8 are combined in a manner similar to that explained above with reference to the embodiment of FIG. 1 to obtain corrective data for eliminating error introduced by the measuring/correcting apparatus. The discussion above with reference to FIG. 2 also applies to this embodiment in FIG. 4.

The separation of a side to be corrected will be explained with reference to FIG. 3.

After the first measurement of an unbalance point, a correction of Xg is made on the left at an angle of 0 degrees, for example. After the correction is made on the left, the remaining unbalance amount on the left becomes 0 g but the measured unbalance on the right becomes Yg at an angle of 180 degrees because of the influence of the correction made on the left.

This is because the plane separation of the side to be corrected was not done accurately. So at the corrective operational/computing circuit 9, an error can be prevented from occurring by outputting corrective data t the side to be corrected by $X \times Y/X$ g as against Xg of unbalance amount, and at the separation circuit to correct a side by correcting the situation by deducting corrective data to separate said corrected side from the unbalance amount on the right.

By checking the result of a previous correction by measuring for a second time, an error can be corrected and the information used for the next correction. So it becomes possible to avoid errors which are introduced by the measuring correcting apparatus.

Figure 5:
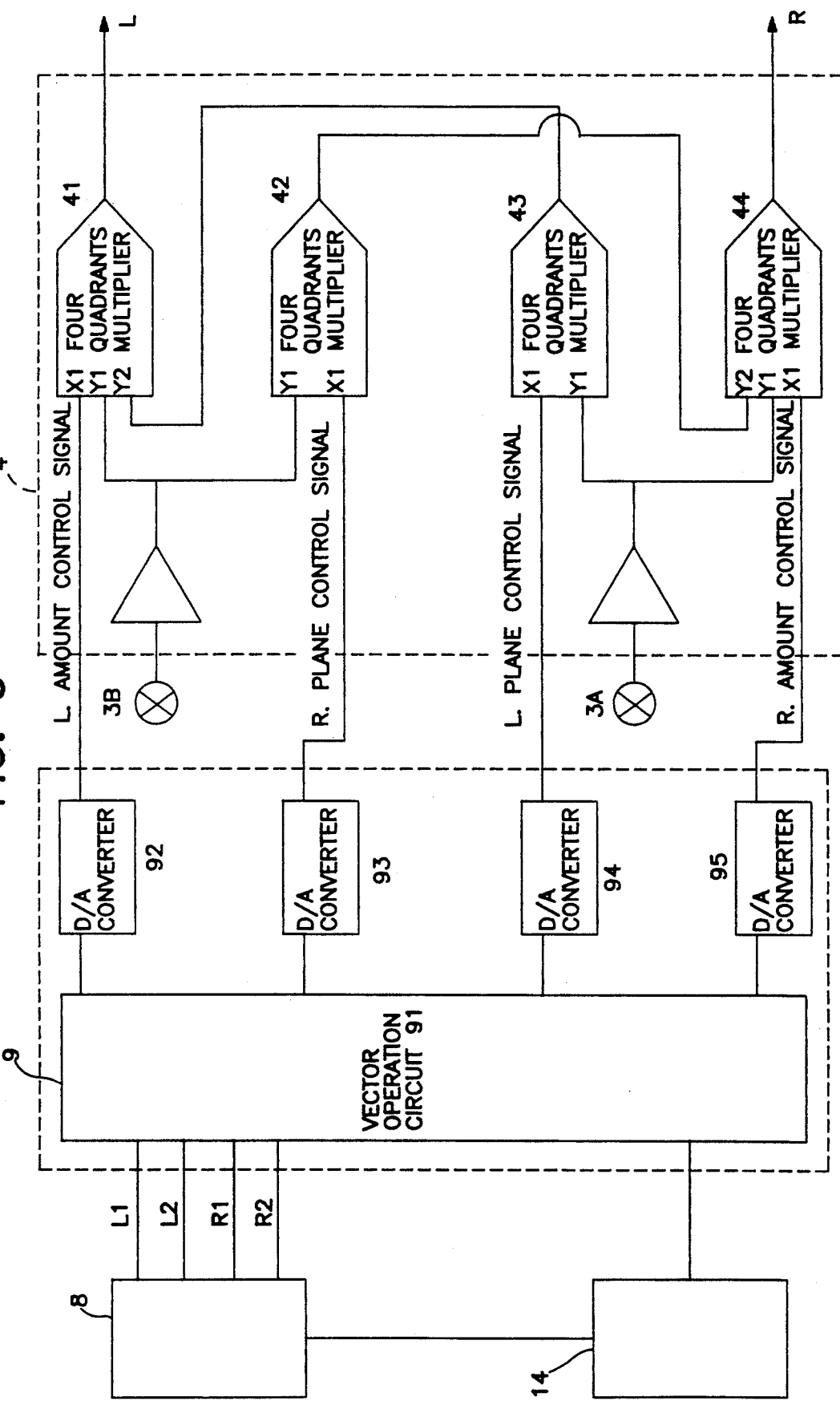
FIG. 5 is a block diagram on an enlarged scale focused on the sub-elements in the operational/computing circuit and the separation circuit, and on their interrelationships.

Referring now to FIG. 5, in this embodiment a digital signal output from the memory circuit 8 is converted to an analog signal in the corrective operational/computing circuit 9 to separate a side to be corrected first, and then in the separation circuit 4 of a side to be corrected, it is analog-operated with an analog signal output from the vibration detecting device of unbalance points. However, it is also allowable that the analog signal output from the vibration detecting device of unbalance points is converted to a digital signal first, and then it is digital-operated with a digital signal output from the memory circuit 8.

A signal L1 is the first measured data at the left side, a signal L2 is a remeasured data after correction at the left side, a signal R1 is the first measured data at the right side, and a signal R2 is a remeasured data after correction at the right side. Vector operation circuit 91 is composed of a microcomputer and 92, 93, 94 and 95 are D/A converters converting a digital signal output from circuit 91 to an analog signal. A left amount control signal, a right amount control signal, a left plane control signal and a right plane control signal are output from a vector operation circuit 91 according to the signals L1, L2, R1 and R2, respectively. Signals detected by a left detector 3A and a right detector 3B are corrected through operation by four quadrant multipliers 41, 42, 43, and 44 and the signals are output by a separation circuit 4 of a side to be corrected.

The object of said separation circuit 4 of a side to be corrected is to avoid the influence on the other side when a certain place on one side is corrected by removing or adding weight.

The operation of said vector operation circuit 91 is as follows:

First, suppose that said signal L1 indicates a phase angle and an unbalance amount of the measured data of an unbalance on the left side to be x1 and X1g, respectively, and that said signal R1 indicates a phase angle and an unbalance amount of the measured data of an unbalance on the right side by be y1 and Y1g, respectively. At this time, a left plane control signal is described as LP1 voltage and a left amount control signal is described as LA1 voltage.

Next, only the left side is corrected. That is, the phase angle x1 and the unbalance amount X1 are corrected on the left side.

Next, remeasurements are taken. These remeasured data are described as (X2, x2) and (Y2, y2) by said signals L2, R2.

In this case, when $Y1 \neq Y2$ and $y1 \neq y2$, the left plane control signal can remain LP1 voltage and no correction is needed. That is to say, a separation of a side to be corrected has been completed.

However, when $Y1=Y2$ and $y1=y2$, since a separation of a side to be corrected has not been completed, a correction is needed. The correction is as follows:

By subtracting the first measured data (Y1, y1) on the right side from the remeasured data (Y2, y2) on the right side by way of vector operation, a vector (Y3, y3) which describes an error of a separation of a side to be corrected occurring by the correction of X1g on said left side can be calculated. Here, according to a vibration detecting device of unbalance points and the theory of movement of a rotating measured object, a difference between the phase angle components y3 and x1 of said measured data is 0 degree or 180 degrees.

When the corrected left plane control signal is described as LP2 volt, the resultant can be expressed as:

$$LP2 = LP1 + (LP1 \cdot Y/X1)$$

A complete separation of a side to be corrected can be obtained according to the above formula. The same methodology can be applied for a correction of a right angle control signal.

Further, when the corrected left amount control signal is described as LP2 volt, the resultant formula can be expressed as:

$$LA2 = LA1 + (LA1 \cdot X2/X1)$$

The same can be applied for a correction of a right amount control signal. However, no correction is needed when $X2=0$. When $X2 \neq 0$ and $x2 \neq x1$, one can suppose that an error of positioning has occurred.

According to the present invention, therefore, errors caused by the deviations of characteristics inherent to said unbalance point measuring method and apparatus as well as the unbalance point correction method and apparatus can be corrected and eliminated so that it is possible to maintain the frequency of corrections at a minimum and the resulting error below an acceptable levels in terms of precision of unbalance points.

In other words, according to the present invention, it becomes possible to provide an unbalance point correction apparatus having a learning function.

What is claimed is:

1. An unbalance point corrective method characterized by the following steps:
    an object to be measured is rotated and measured for its unbalance points;
    based upon the result of which measurement a correction is made for said unbalance points to the measured object in accordance with preset corrective characteristics based upon the measurement result of the unbalance points;
    said measured object is rotated and measured again for said unbalance points which are corrected in accordance with said corrective characteristics based on the result of the second measurement;
    and subsequent corrections of said unbalance points are made in accordance with the corrective characteristics.

2. An unbalance point correction apparatus comprising:
    an unbalance point measuring apparatus to measure unbalance points by rotating an object to be measured;
    a corrective data operational/computing circuit to operationally output corrective data by preset corrective characteristics based on the measurement result of the unbalance points;
    an unbalance point correction apparatus to correct the unbalance points of said object to be measured based on the corrective data;
    a control circuit to control said unbalance point measuring apparatus to repeat measurement of the unbalance points of said measured object whose unbalance points were already measured and corrected once; and
    a correction circuit of corrective characteristics to correct said corrective characteristics based on the measurement result of unbalance points if the result of the repeat measurement is greater than a preset level.

3. An unbalance point corrective method comprising:
    rotating an object a first time to detect the amount and angle of any unbalance of the object;
    using preset corrective characteristics to correct the object for the unbalance detected during said first rotating time;
    rotating said object a second time to detect the amount and angle of any unbalance remaining in said object after it has been corrected;
    combining the amount and angle of unbalance detected in the corrected object with the amount and angle of unbalance detected during said first rotating time to form a correction quantity;
    using said correction quantity to improve said corrective, characteristics; and
    using said improved corrective characteristics to correct the object for unbalance.

4. The unbalance point corrective method of claim 3, wherein said combining step includes a vector operation.

5. The unbalance point corrective method of claim 3, whereon said combining step includes vector addition.

6. The unbalance point corrective method of claim 3, wherein said combining step includes vector addition and vector subtraction.

7. An unbalance point correction apparatus which comprises:
    means upon which an object to be rotated is placed,
    means for rotating said object, a vibration detection device for detecting any unbalance points of said object, an analysis circuit for receiving signals from said vibration detection device for analyzing the signals and for providing an output corresponding to an angular position and amount of any unbalance, a memory circuit for receiving signals from said analysis circuit, a corrective data output circuit for receiving signals from said analysis circuit, an unbalance point correcting device for receiving signals from said corrective data output circuit, an operational computer circuit which receives signals from said memory circuit, an unbalance correction computer which receives a signal from said operational computer circuit and from said data output circuit, an angle correction computer which receives a signal from said unbalance correction computer and which directs a signal to an angular positioning circuit, a control circuit for controlling said data output circuit, said unbalance point correcting device, said memory circuit, said angular positioning circuit and a motor drive circuit which positions said object in a position for unbalance correction.

* * * * *